United States Patent
Zhang (10) Patent No.: US 11,988,016 B1
(45) Date of Patent: May 21, 2024

(54) DEVICES FOR IN-WATER AUTOMATIC SPREADING

(71) Applicant: XINGMAI INNOVATION TECHNOLOGY (SUZHOU) CO., LTD., Jiangsu (CN)

(72) Inventor: Shilei Zhang, Suzhou (CN)

(73) Assignee: XINGMAI INNOVATION TECHNOLOGY (SUZHOU) CO., LTD., Suzhou (CN)

( * ) Notice: Subject to any disclaimer, the term of this patent is extended or adjusted under 35 U.S.C. 154(b) by 0 days.

(21) Appl. No.: 18/353,078

(22) Filed: Jul. 15, 2023

Related U.S. Application Data (63) Continuation of application No. PCT/CN2023/091115, filed on Apr. 27, 2023.

(51) Int. Cl.
*E04H 4/12* (2006.01)
*C02F 103/42* (2006.01)

(52) U.S. Cl.
CPC ......... *E04H 4/1281* (2013.01); *E04H 4/1209* (2013.01); *C02F 2103/42* (2013.01)

(58) Field of Classification Search
CPC .. E04H 4/1281; E04H 4/1209; C02F 2103/42
USPC ..... 210/167.11, 143, 167.16, 167.17; 15/1.7; 422/255
See application file for complete search history.

(56) References Cited

U.S. PATENT DOCUMENTS

| | | | | |
|---|---|---|---|---|
| 3,868,739 A | * | 3/1975 | Hargrave | E04H 4/1636 210/167.16 |
| 5,129,415 A | * | 7/1992 | Runyon | C02F 1/686 210/101 |
| 5,422,014 A | * | 6/1995 | Allen | C02F 1/008 210/743 |
| 8,007,653 B2 | * | 8/2011 | Porat | E04H 4/1654 205/744 |

(Continued)

FOREIGN PATENT DOCUMENTS

| CN | 203361701 U | | 12/2013 |
|---|---|---|---|
| CN | 103696592 A | * | 4/2014 |

(Continued)

OTHER PUBLICATIONS

Machine-generated English translation of CN 103696592, generated on Sep. 14, 2023.*

*Primary Examiner* — Fred Prince
(74) *Attorney, Agent, or Firm* — METIS IP LLC (57) ABSTRACT

The present disclosure provides a device for in-water automatic spreading configured to spread a medicament in a water body. The device includes a storage module config to move in the water body according to a walking route, and a control module configured to control the driving module and the walking module. The control module is connected with the driving module and the walking module.

19 Claims, 6 Drawing Sheets

(56) References Cited

U.S. PATENT DOCUMENTS

| | | | | |
|---|---|---|---|---|
| 8,709,243 | B2 * | 4/2014 | Hui | C02F 1/688 |
| | | | | 210/167.17 |
| 8,795,510 | B2 * | 8/2014 | Porat | E04H 4/1654 |
| | | | | 205/744 |
| 2002/0096198 | A1 * | 7/2002 | Bredo | E04H 4/1654 |
| | | | | 210/167.25 |
| 2008/0237103 | A1 * | 10/2008 | King | E04H 4/1654 |
| | | | | 210/764 |
| 2009/0282627 | A1 * | 11/2009 | Porat | G06Q 20/3255 |
| | | | | 204/229.4 |
| 2021/0197932 | A1 | 7/2021 | Wu et al. | |

FOREIGN PATENT DOCUMENTS

| | | |
|---|---|---|
| CN | 209053474 U | 7/2019 |
| CN | 111155798 A | 5/2020 |
| CN | 111456507 A | 7/2020 |
| WO | 2016044960 A1 | 3/2016 |
| WO | 2021100033 A1 | 5/2021 |

* cited by examiner

DEVICES FOR IN-WATER AUTOMATIC SPREADING

CROSS-REFERENCE TO RELATED APPLICATIONS

This application is a Continuation of International Application No. PCT/CN2023/091115, filed on Apr. 27, 2023, the contents of which are hereby incorporated by reference.

TECHNICAL FIELD

The present disclosure relates to the field of water body cleaning, in particular, to a device for in-water automatic spreading.

BACKGROUND

Water quality maintenance of a swimming pool is a very important issue. If the water quality is not well maintained, the swimming pool may become a place for spreading diseases. At present, a maintainer generally carries out regular maintenance on the water quality of the swimming pool, such as algae removal, clarification, disinfection, etc. Specifically, after the maintainer sets a proportion of medicament according to the water volume of the swimming pool, the medicament is manually spread on the water surface of the swimming pool, and then a swimming pool circulation system is started to mix the medicament over the swimming pool. However, through manual spreading, the medicament is often unable to cover all places in the swimming pool. Therefore, it is necessary to spread the medicament by means of the swimming pool circulation system, but the maintenance manner still cannot ensure that the medicament is spread to every portion of the swimming pool evenly, which may cause uneven maintenance. In addition, the maintenance period required for the maintenance manner mentioned above is long and has a high maintenance cost.

Therefore, it is desirable to provide a device for in-water automatic spreading, which uniformly and automatically spreads the medicament everywhere in a water body, so as to shorten the maintenance period of the water body and reduce the maintenance cost.

SUMMARY

An aspect of the present disclosure provides a device for in-water automatic spreading. The device includes a storage module configured to store a medicament to be spread and a driving module configured to drive the medicament to be spread to be separated from the storage module. The driving module is connected to the storage module. The device also includes a medicament outlet configured as an outlet for the medicament to be spread to enter a liquid after being separated from the storage module, a walking module configured to drive the device for in-water automatic spreading to move in the water body according to a walking route, and a control module configured to control the driving module and the walking module. The control module is connected to the driving module and the walking module.

Another aspect of the present disclosure provides a method for automatic spreading in water. The method is applied to a device for in-water automatic water spreading described in the embodiments of the present disclosure. When the method is executed by the control module, the method includes obtaining a target task for a target water body. The target task includes performing a spreading task and/or a cleaning task in a target region of the target water body. The method also includes determining, based on the target task, a first working parameter of the driving module, a second working parameter of the walking module, a type of the medicament to be spread, and a medicament dose, and controlling, based on the first working parameter, the second working parameter, the type of medicament to be spread, and the medicament dose, the device for in-water automatic spreading to complete the target task.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

Illustrations of reference numerals in the figures: 100, a device for in-water automatic spreading; 110, a storage module; 111, an outlet of a rigid storage chamber; 112-1, a first bending portion; 112-2, a second bending portion; 112-3, a third bending portion; 112-4, a fourth bending portion; 120, a driving module; 121, a driving pump; 121-1, a driving pump body; 121-2, a first pipeline; 121-3, a second pipeline; 130, a medicament outlet; 140, a walking module; 141, a track; 142-1, a first propeller; 142-2, a second propeller; 150, a control module; 160, an agitating module; 170, a cleaning module; 171, a dust box; 172, a rolling brush; 180, a main water pump; 181, a main water pump impeller; 182, a main water pump body; 191, liquid inlets; 191-1, a first liquid inlet; 191-2, a second liquid inlet; 191-3, a third liquid inlet; 192, a liquid outlet.

DETAILED DESCRIPTION

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

It will be understood that the terms "system," "device," "unit," and/or "module" used herein are one method to distinguish different components, elements, portions, sections, or assemblies of different levels. However, the words may be replaced by other expressions if other words can achieve the same purpose.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, operations, elements, operations, and/or components, but do not exclude the presence or addition of one or more other integers, devices, behaviors, features, operations, elements, operations, components, and/or groups thereof.

The flowchart is used in the present disclosure to illustrate the operations performed by the system according to the embodiment of the present disclosure. It should be understood that the preceding or following operations are not necessarily performed in the exact order. Instead, various operations may be processed in reverse order or simultaneously. At the same time, other operations may be added to these procedures, or a certain operation or operations can be removed from these procedures.

When manually spreading a medicament to a swimming pool, the spread medicament cannot cover all places in the swimming pool. Therefore, the medicament needs to be spread in the swimming pool by a swimming pool circulation system. However, the swimming pool circulation system still cannot ensure that the medicament can spread to every place in the swimming pool evenly, which may lead to an uneven maintenance condition in the swimming pool. In addition, the spread of the medicament by means of the swimming pool circulation system requires a long maintenance period and a high maintenance cost. In some embodiments of the present disclosure, the manual spreading of the medicament to the swimming pool may be replaced by arranging a device for in-water automatic spreading, so that the medicament may be fully and evenly mixed to every corner of the swimming pool without using the swimming pool circulation system. In addition, the device for in-water automatic spreading illustrated in some embodiments of the present disclosure may further clean and spread the medicament to the swimming pool simultaneously, so as to shorten the maintenance period of the swimming pool and reduce the maintenance cost.

Figure 1:
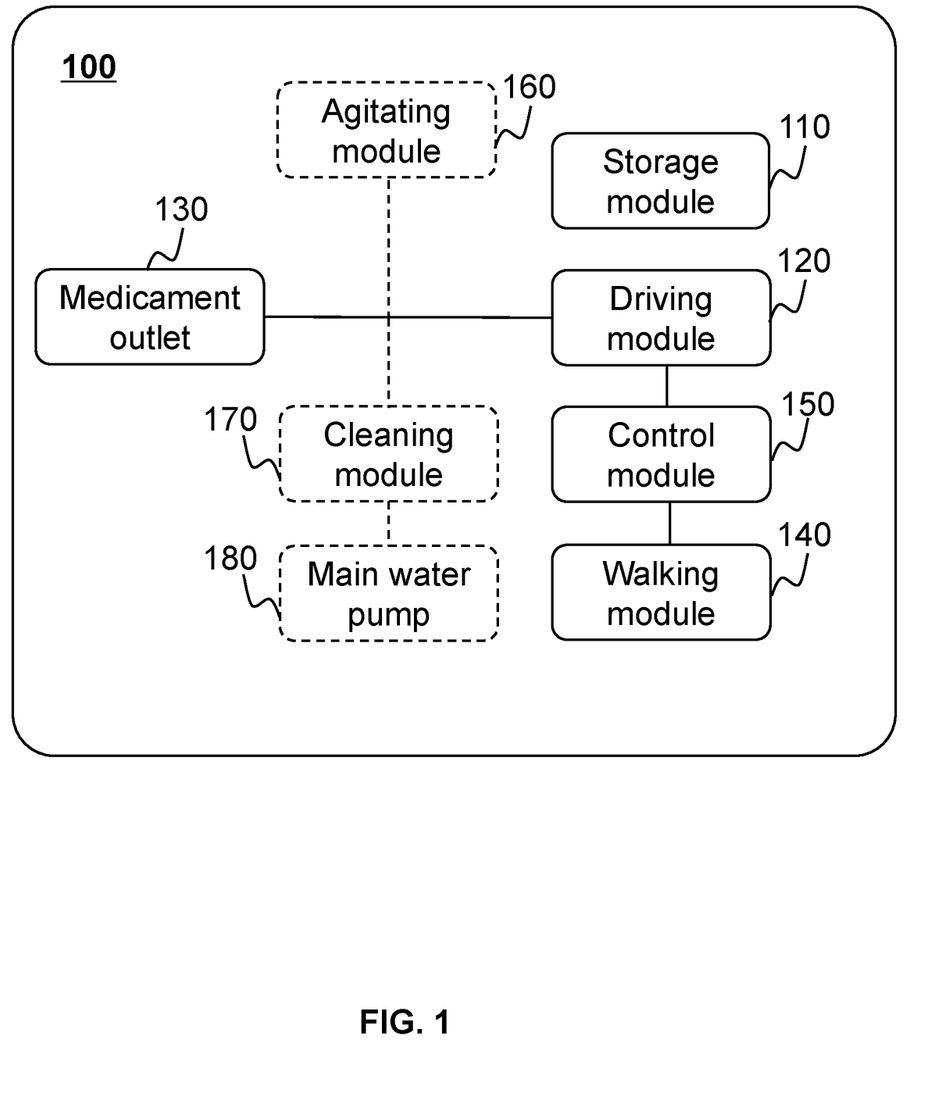
FIG. 1 is a block diagram illustrating an exemplary device for in-water automatic spreading according to some embodiments of the present disclosure.
Figure 2:
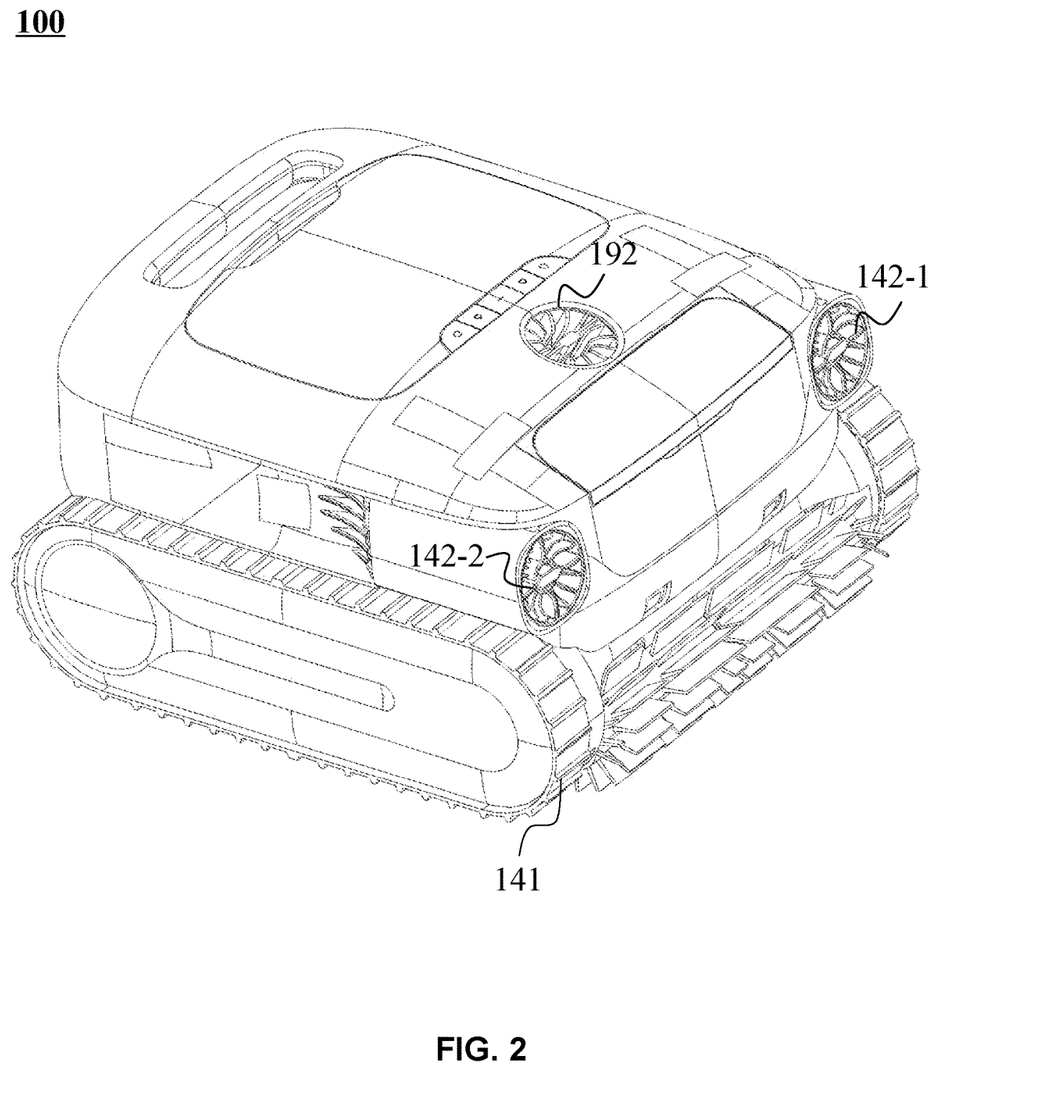
FIG. 2 is a block diagram illustrating an exemplary device for in-water automatic spreading according to some embodiments of the present disclosure.

FIG. 1 is a block diagram illustrating an exemplary device for in-water automatic spreading according to some embodiments of the present disclosure.

A device 100 for in-water automatic spreading may be configured to automatically spread a medicament in a water body (such as a swimming pool). For example, the device 100 for in-water automatic spreading may automatically spread the medicament while floating on the water surface or completely submerged in the water body. As illustrated in FIG. 1, the device 100 for in-water automatic spreading may include a storage module 110, a driving module 120, a walking module 140, and a control module 150.

The storage module 110 may be configured to store a medicament to be spread. The medicament to be spread refers to a required medicament when the device 100 for in-water automatic spreading performs maintenance such as an algae removal, a clarification, a disinfection, etc., on the water body. The medicament to be spread may be solid or liquid. The medicament to be spread may include a clarifier, an algaecide, a coagulation aid, a disinfectant, a PH value regulator, etc.

The driving module 120 may be configured to drive the medicament to be spread to be separated from the storage module 110. The driving module 120 may be connected with the storage module 110 to drive the medicament to be spread to be separated from the storage module 110.

Figure 3A:
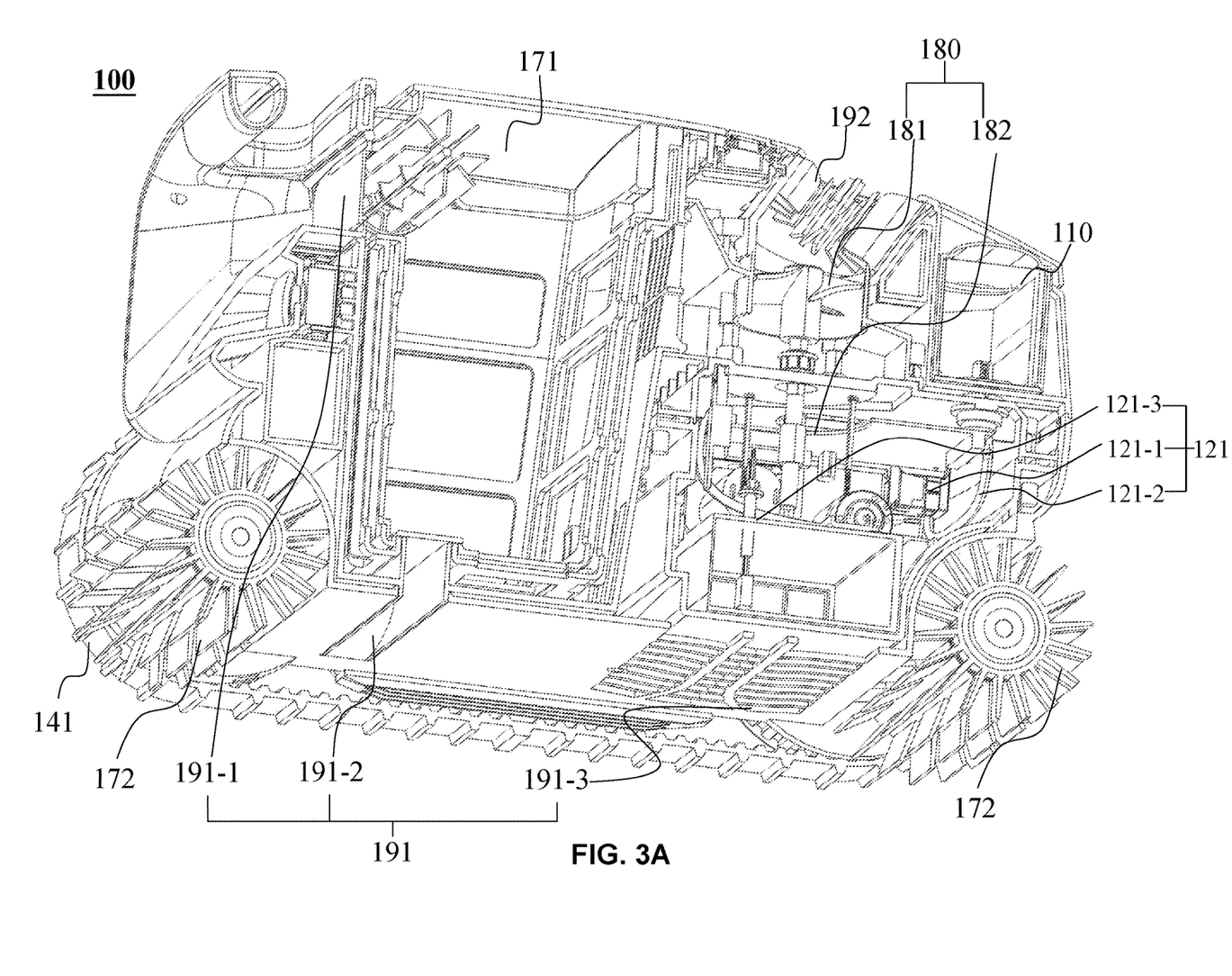
FIG. 3A is a schematic cross-sectional view illustrating a device for in-water automatic spreading according to some embodiments of the present disclosure.
Figure 3B:
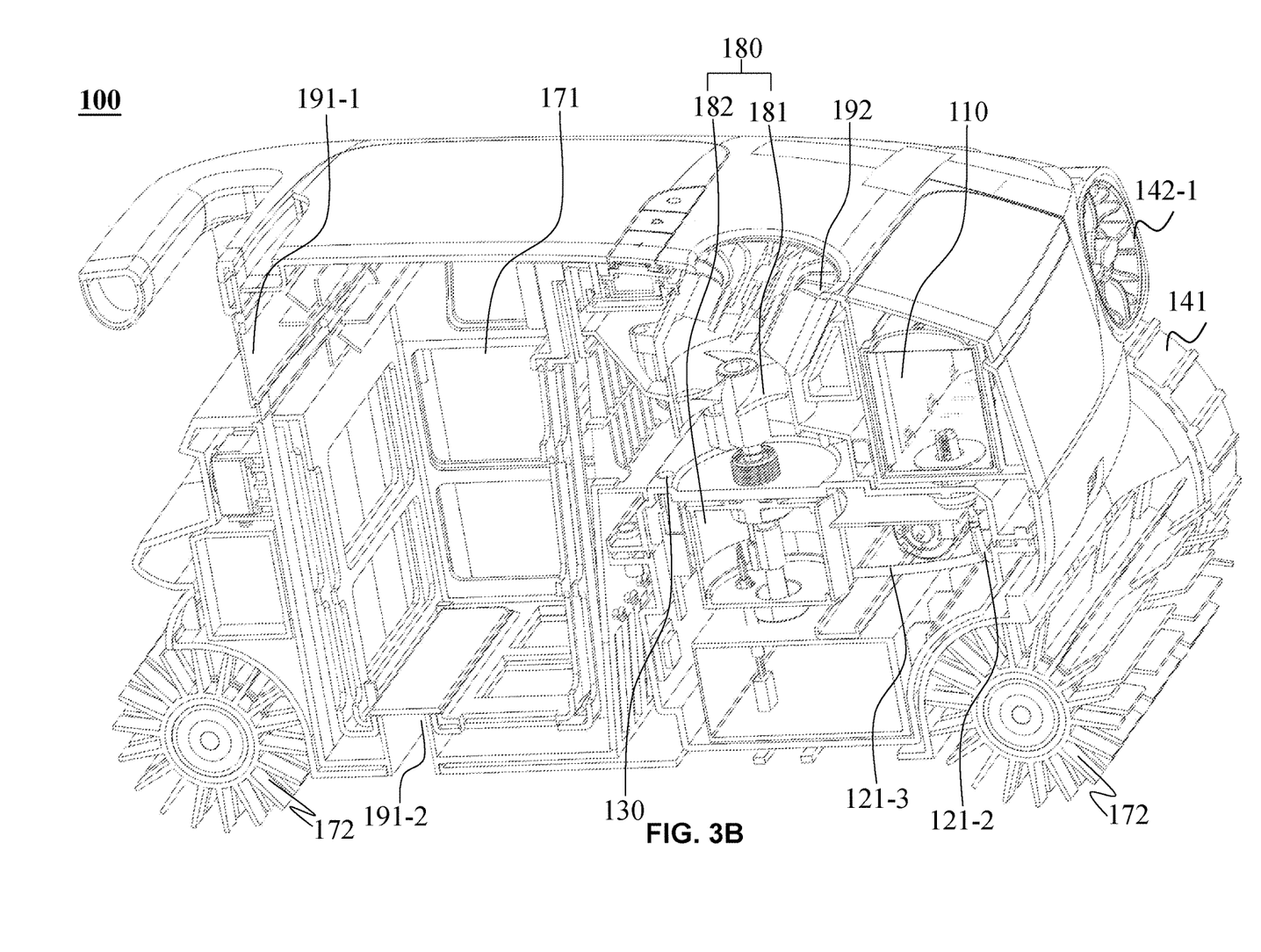
FIG. 3B is another schematic cross-sectional view illustrating a device for in-water automatic spreading according to some embodiments of the present disclosure.

A medicament outlet 130 may be used as an outlet for the medicament to be spread to enter the liquid after being separated from the storage module 110. The device 100 for in-water automatic spreading may include one or more medicament outlets 130. As illustrated in FIG. 3B, the medicament outlet(s) 130 may be arranged inside the device 100 for in-water automatic spreading. After the medicament to be spread flows out from the medicament outlet(s) 130, the medicament may be mixed with other liquids (e.g., a cleaned liquid) in a same space, and then flows out from a liquid outlet 192. More details about the cleaned liquid and the liquid outlet 192 may be found elsewhere in the present disclosure. In some embodiments, the medicament outlet(s) 130 may further be arranged on a shell of the device 100 for in-water automatic spreading. For example, the medicament outlet(s) 130 may be arranged on at least one of a top portion, a bottom portion, and a side portion of the shell of the device 100 for in-water automatic spreading, so that the medicament to be spread may directly enter the water body through the medicament outlet(s) 130 to complete the spreading. In some embodiments, when the device 100 for in-water automatic spreading floats on a water surface to spread the medicament, the device 100 for in-water automatic spreading may further include at least one medicament outlet 130 arranged below the water surface to ensure that the medicament to be spread may enter the water body. For example, when the device 100 for in-water automatic spreading floats on the water surface to spread the medicament, the medicament outlet 130 may be arranged on the side portion of the shell of the device 100 for in-water automatic spreading below the water surface, or may be arranged on the bottom portion of the shell of the device 100 for in-water automatic spreading.

The walking module 140 may be configured to drive the device 100 for in-water automatic spreading to move according to a walking route. The walking module 140 may include various components used to drive the device 100 for in-water automatic spreading to move. As illustrated in FIG. 3A and FIG. 3B, the walking module 140 may include a track 141. The device 100 for in-water automatic spreading may move on a bottom of the water through the track 141. The walking module 140 may further include a first propeller 142-1 and a second propeller 142-2. The first propeller 142-1 and the second propeller 142-2 may discharge liquid outward, so as to obtain a driving force to drive the device 100 for in-water automatic spreading to move in the water body under an opposite acting force of the discharged liquid.

The walking route refers to a route traveled by the device 100 for in-water automatic spreading when performing the maintenance such as the algae removal, the clarification, the disinfection, etc., in the water body. The walking route may include a rectangular walking route, a random walking route, a zigzag walking route, a spiral walking route, etc. The walking route may be set by a user (e.g., a maintainer of the swimming pool) as needed. For example, when the device 100 for in-water automatic spreading is used to disinfect a certain large water body, the user may set the walking route as the spiral walking route. That is, the device 100 for in-water automatic spreading may walk in the water body along the spiral walking route and spread the disinfectant. The device 100 for in-water automatic spreading may gradually shrink from an outside to an inside of the water body until an overall surface of the water body is covered. In some embodiments, the walking route may further be determined by other manners. For example, the control module 150 may determine the walking route based on a parameter determination model. More details about determining the walking route based on the parameter determination model may be found elsewhere in the present disclosure, such as FIG. 5 and the related descriptions thereof.

Some embodiments of the present disclosure may quickly and accurately determine the walking route of the device 100 for in-water automatic spreading in the water body through the parameter determination model, so as to perform a targeted spreading of the medicament, improve a maintenance efficiency of the water body, and reduce the maintenance cost.

The control module 150 is configured to control the driving module 120 and the walking module 140. The control module 150 may be connected with the driving module 120 and the walking module 140 through signals (e.g., a Bluetooth connection), so as to control the driving module 120 and the walking module 140.

The control module 150 may control the driving module 120 based on a first working parameter. The first working parameter refers to a relevant parameter when the driving module 120 is working. In some embodiments, the first working parameter may at least include a separating speed of the medicament to be spread to be separated from the storage module 110. For example, the first working parameter may be 0.25 mL/S, which indicates that the driving module 120 drives the medicament to be spread in a volume of 0.25 mL to be separated from the storage module 110 per second.

In some embodiments, the first working parameter may also include one or more of a spreading time range, a driving interval, and a driving duration. The spreading time range may be a time range in which the driving module 120 may drive the medicament to be spread to be separated from the storage module 110. The driving interval refers to an interval between the driving module 120 driving the medicament to be spread to be separated from the storage module 110 at twice. The driving duration refers to a duration when the driving module 120 drives the medicament to be spread to be separated from the storage module 110 at once. For example, the first working parameter may further include a driving interval of 5 seconds (5S) and a driving duration of 3 seconds (3S). That is, the driving module 120 may drive the medicament to be spread to be separated from the storage module 110 for 3 seconds, have a rest for 5 seconds, and then drive the medicament to be spread to be separated from the storage module 110 for 3 seconds, or the like. For another example, the first working parameter may further include a spreading time range of 13 seconds (13S) and a driving duration of 5 seconds (5S). That is, in each spreading time range of 13 seconds, the driving module 120 may drive the medicament to be spread to be separated from the storage module 110 for 5 seconds. The 5 seconds mentioned above may be any time in the spreading time range mentioned above. For example, the 5 seconds mentioned above may be the first 5 seconds or the last 5 seconds in the spreading time range mentioned above.

The control module 150 may control the walking module 140 based on a second working parameter. The second working parameter refers to a relevant parameter when the walking module 140 is working. The second working parameter may include a walking speed and a walking route of the walking module 140.

In some embodiments, the control module 150 may determine the first working parameter and the second working parameter based on various manners. The first working parameter and/or the second working parameter may be preset default parameters. When the first working parameter or the second working parameter is the preset default parameter, the control module 150 may control a spreading amount of the medicament to be spread per unit volume (e.g., per m3) in the water body by adjusting the other parameter that is not the default parameter. When the first working parameter and the second working parameter are the preset default parameters, a concentration of the medicament to be spread may be adjusted in advance to adjust the spreading amount of the medicament.

In some embodiments, the control module 150 may further perform a modeling or use various data analysis algorithms, such as a regression analysis, a discriminant analysis, etc., to determine the first working parameter and the second working parameter. The control module 150 may determine the first working parameter of the driving module 120 and/or the second working parameter of the walking module 140 based on a target task. More details about the embodiments mentioned above may be found elsewhere in the present disclosure, such as FIG. 5 and the related descriptions thereof.

Some embodiments of the present disclosure may use the device 100 for in-water automatic spreading to maintain the water body instead of manually spreading the medicament to the water body. The medicament is fully and evenly mixed to every corner of the water body without using a circulation system (e.g., the swimming pool circulation system), which shortens the maintenance period of the water body and reduce the maintenance cost.

In some embodiments, the driving module 120 may include a driving pump 121. The driving pump 121 may be configured to drive the medicament to be spread to be separated from the storage module 110. The driving pump 121 may be a peristaltic pump or any other pump (e.g., a syringe pump) that may implement a function of the driving pump 121. An end of the driving pump 121 may be connected with an outlet of the storage module 110, and another end of the driving pump 121 may be connected with the medicament outlet 130. An end of the driving pump 121 may be directly in communication with the medicament outlet 130, or may be in communication with the medicament outlet 130 through other components of the device 100 for in-water automatic spreading. As illustrated in FIG. 3A and FIG. 3B, the driving pump 121 may include a driving pump body 121-1, a first pipeline 121-2, and a second pipeline 121-3. The driving pump body 121-1 may be configured to provide a driving force for driving the medicament to be spread to be separated from the storage module 110. The first pipeline 121-2 may be configured as a pipeline through which the medicament to be spread is separated from the storage module 110. An end of the first pipeline 121-2 may be connected with the outlet of the storage module 110, and another end of the first pipeline 121-2 may be connected with the driving pump body 121-1. The second pipeline 121-3 may be configured to guide the medicament to be spread to the medicament outlet 130. An end of the second pipeline 121-3 is connected with the driving pump body 121-1, and another end of the second pipeline 121-3 is in communication with the medicament outlet 130. Thus, the medicament to be spread may be separated from the outlet of the storage module 110 under the driving of the driving pump body 121-1, and flow out from the medicament outlet 130 through the first pipeline 121-2 and the second pipeline 121-3.

In some embodiments of the present disclosure, the driving pump 121 is used to drive the medicament to be spread to be separated from the storage module 110, so that the medicament is spread in the water body, thus, the device 100 for in-water automatic spreading may evenly and comprehensively spread the medicament with a high spreading efficiency.

In some embodiments, the driving module 120 may further include a piston driving member. More details about the piston driving member may be found elsewhere in the present disclosure.

In some embodiments, the storage module 110 may include a storage chamber. The storage chamber may be configured to store the medicament to be spread. In some embodiments, the storage module 110 may include one or more storage chambers. Different storage chambers may be configured to store different medicaments to be spread. When the storage module 110 includes a plurality of storage chambers, the driving module 120 may be connected with each storage chamber, so that a corresponding medicament to be spread may be driven to be separated from the storage chamber. Simultaneously, the driving module 120 may further carry out a compound spreading of various medicaments to be spread to avoid replacing the medicament to be spread stored in the storage chamber when different medicaments need to be spread.

The storage chamber may include a flexible storage chamber and/or a rigid storage chamber. In some embodiments, the storage chamber may further include a sealing member. The sealing member may be configured to achieve a sealing storage of the medicament to be spread in the storage chamber, so as to avoid a leakage of the medicament into an external liquid. The sealing member may be various structures capable of sealing the storage chamber. Merely by way of example, when the storage chamber is the rigid storage chamber, the sealing member may be a sealing cover. A main body of the rigid storage chamber and the sealing cover may have thread structures matching with each other. The sealing cover may seal the rigid storage chamber through the thread structure.

The medicament to be spread may be stored in the flexible storage chamber. The flexible storage chamber may be made of flexible material. The flexible material may include one or more of polyvinyl alcohol resin, polyethylene terephthalate, rubber, etc. The flexible material has a certain flexibility, so that the flexible storage chamber may be deformed. It should be understood that when the medicament to be spread is separated from the flexible storage chamber, a space of the flexible storage chamber may be reduced accordingly, so as to realize an automatic adjustment of a pressure in the flexible storage chamber and ensure a water pressure balance inside and outside the flexible storage chamber, thus, the medicament to be spread may be separated from the flexible storage chamber smoothly.

In some embodiments, the flexible storage chamber may include a flexible storage bag. The flexible storage bag may store a liquid medicament to be spread or a solid medicament to be spread that has been dissolved in a liquid state in advance. Before usage, the medicament to be spread may be stored in the flexible storage bag, and the medicament to be spread may be sealed in the flexible storage bag through a heat sealing process. An outlet of the flexible storage bag may be connected with an end of the driving pump 121. In some embodiments, the flexible storage chamber may also be another flexible structure. For example, the flexible storage chamber may also be a flexible storage ball.

The medicament to be spread may further be stored in the rigid storage chamber. An outlet of the rigid storage chamber is connected with the first pipeline 121-2 of the driving pump 121. The rigid storage chamber may be made of rigid material (e.g., glass, ceramic, etc.). It should be understood that, since the rigid material is difficult to be deformed, when the medicament to be spread is separated from the rigid storage chamber, a pressure in the rigid storage chamber may be changed. If the water pressure is not adjusted, the medicament to be spread may not be able to be separated from the rigid storage chamber smoothly. In some embodiments, the rigid storage chamber may include a pressure regulating member. The pressure regulating member may be configured to adjust the pressure in the rigid storage chamber, so as to ensure a pressure balance between the inside and the outside of the rigid storage chamber. For example, when the medicament to be spread is separated from the rigid storage chamber, the pressure regulating member may drive air to be injected into the rigid storage chamber, so as to ensure an achievement of the balance between the pressure (such as an air pressure and/or a water pressure) in the rigid storage chamber and the water pressure outside the rigid storage chamber, thus, the medicament to be spread may be separated from the rigid storage chamber smoothly.

In some embodiments, when the device 100 for in-water automatic spreading includes the flexible storage chamber and the rigid storage chamber, the flexible storage chamber may further be arranged in the rigid storage chamber to protect the flexible storage chamber from being damaged.

In some embodiments, the driving module 120 may include the piston driving member. The piston driving member is movable in the rigid storage chamber to squeeze out the medicament to be spread in the rigid storage chamber.

In some embodiments of the present disclosure, the pressure in the rigid storage chamber is adjusted by the pressure regulating member, and the medicament to be spread in the rigid storage chamber is squeezed out by the piston driving member, so that the medicament may be evenly spread in the water body, thereby ensuring that an appropriate amount of the medicament may be well mixed with the pool water.

Figure 4:
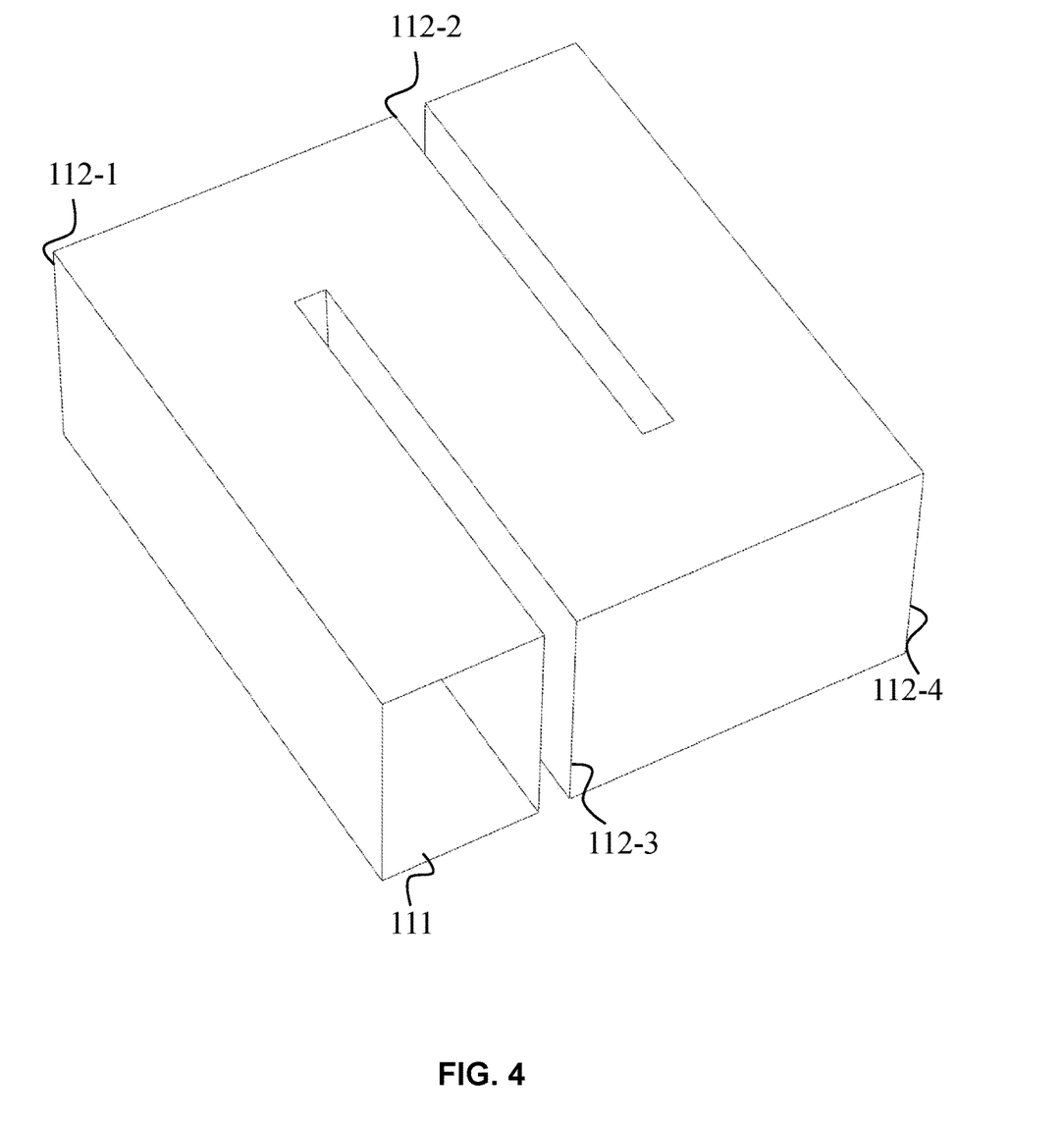
FIG. 4 is a schematic diagram illustrating a rigid storage chamber according to some embodiments of the present disclosure.

The rigid storage chamber may include a structure in various shapes. For example, the rigid storage chamber may include a cuboid structure or a cylinder structure. In some embodiments, the rigid storage chamber may include at least one bending portion. The bending portion may be bent at a right angle or another angle, or may be bent in an arc shape. As illustrated in FIG. 4, the rigid storage chamber may include an outlet 111 of the rigid storage chamber, a first bending portion 112-1, a second bending portion 112-2, a third bending portion 112-3, and a fourth bending portion 112-4. The first bending portion 112-1, the second bending portion 112-2, the third bending portion 112-3, and the fourth bending portion 112-4 are bent at the right angle.

It should be understood that when the rigid storage chamber is a hollow rectangular structure without the bending portion or another structure, and the piston driving member moves in the rigid storage chamber, if the rigid storage chamber has a large volume, even a small moving displacement of the piston driving member may also squeeze out more medicament to be spread, which is not convenient for precise control of the amount of the medicament to be spread. If the volume of the rigid storage chamber is small, although the precise control of the amount of the medicament to be spread may be realized, a total volume of the medicament to be spread that may be stored in the rigid storage chamber is small, which is not convenient for use. In some embodiments of the present disclosure, the rigid storage chamber may be divided into a plurality of small pipe-like structures by arranging at least one bending portion in the rigid storage chamber, so as to ensure the total volume of the medicament to be spread stored in the rigid storage chamber and achieve the precise control of the amount of the medicament to be spread.

In some embodiments, the device 100 for in-water automatic spreading may further include an agitating module 160. The agitating module 160 may be configured to agitate the medicament separated from the storage module 110 so that the medicament is evenly mixed with another liquid in the space where the medicament is located. The agitating module 160 may be arranged at a plurality of positions in the device 100 for in-water automatic spreading. For example, the agitating module 160 may be arranged on a side of the medicament outlet 130 where the medicament to be spread flows out. For another example, the agitating module 160 may further be arranged in another space where the medicament to be spread enters after the medicament is separated from the storage module 110.

In some embodiments, the agitating module 160 may include an agitating member configured to agitate according to a preset motion track. For example, the agitating member may be an agitating rod or an agitating blade that agitates according to the preset motion track. The preset motion track refers to a preset agitating track where the agitating member evenly mixes the medicament to be spread with another liquid in the space. For example, the preset motion track may be a spiral motion track. That is, the agitating member rotates along a spiral track to form a strong eddy current in the water body, so as to evenly mix the medicament to be spread with another liquid. The preset motion track may also be another track, such as an up-and-down motion track. As illustrated in FIG. 3B, the agitating member may be a main water pump impeller 181 of a main water pump 180, and the main water pump impeller 181 agitated according to the preset motion track may be used to evenly mix the medicament to be spread with another liquid in the same space. More details about the main water pump 180 may be found elsewhere in the present disclosure.

In some embodiments, the device 100 for in-water automatic spreading may further include a cleaning module 170 and the main water pump 180.

The cleaning module 170 may be configured to clean the liquid and/or a walking region of the device 100 for in-water automatic spreading. The cleaning module 170 may include one or more of a dust box 171, a filter screen (not shown in the figure), a rolling brush 172, or the like, or other structures capable of cleaning the liquid. The device 100 for in-water automatic spreading may collect garbage or other impurities on the water surface or in the water based on the dust box 171. The filter screen may filter and remove the garbage or other impurities in the liquid. When the walking region of the device 100 for in-water automatic spreading is located at a bottom wall or a side wall of a region (e.g., the swimming pool) accommodating the water body, the rolling brush 172 may further clean the bottom wall or the side wall mentioned above. In some embodiments, the control module 150 may further control the cleaning module 170 based on a third working parameter. The third working parameter refers to relevant parameters when the cleaning module 170 is working. The third working parameter may include an opening and closing state of the dust box 171, a rotation frequency of the roller brush 172, etc. Similar to the first working parameter and the second working parameter, the third working parameter may be a preset default parameter or may be determined by the parameter determination module. More details about determining the third working parameter based on the parameter determination model may be found elsewhere in the present disclosure, such as FIG. 5 and the related descriptions thereof.

The main water pump 180 may drive the external liquid to flow into the cleaning module 170 of the device 100 for in-water automatic spreading through at least one liquid inlet 191 of the device 100 for in-water automatic spreading and drive the cleaned liquid in the cleaning module 170 to be spread into the water body through a liquid outlet 192 of the device 100 for in-water automatic spreading. As illustrated in FIG. 3A and FIG. 3B, the main water pump 180 may include the main water pump impeller 181 and a main water pump body 182. The main water pump body 182 may provide power for a rotation of the main water pump impeller 181, and the main water pump impeller 181 may rotate under the power of the main water pump body 182, so as to provide a suction to drive the liquid in the device 100 for in-water automatic spreading to flow along a preset direction, thereby driving the external liquid to flow into the device 100 for in-water automatic spreading through a first liquid inlet 191-1 and a second liquid inlet 191-2 of the device 100 for in-water automatic spreading. The cleaning module 170 may clean the liquid therein, and the main water pump 180 may drive the cleaning module 170 to discharge the cleaned liquid through the liquid outlet 192.

In some embodiments, an end of the driving module 120 may be in communication with the outlet of the storage module 110, and another end of the driving module 120 may be in communication with the medicament outlet 130. The main water pump 180 may further drive the cleaned liquid to flow through the medicament outlet 130, evenly mix the medicament flowing out of the medicament outlet 130 with the cleaned liquid, and spread the medicament into the water body through the liquid outlet 192.

The device 100 for in-water automatic spreading may include one or more liquid inlets 191 and liquid outlets 192. The liquid inlet(s) 191 may be configured as an inlet for the external liquid to enter the device 100 for in-water automatic spreading. The liquid outlet(s) 192 may be configured as an outlet for the liquid in the device 100 for in-water automatic spreading to leave the device 100 for in-water automatic spreading. In some embodiments, when the device 100 for in-water automatic spreading floats on the water surface to spread the medicament, the device 100 for in-water automatic spreading at least includes a liquid inlet 191 and a liquid outlet 192 arranged below the water surface to ensure that the liquid may be sucked from the water body through the liquid inlet 191 and may be discharged into the water body through the liquid outlet 192. In some embodiments of the present disclosure, the device 100 for in-water automatic spreading is able to operate normally by arranging the liquid inlet 191 on the shell of the device 100 for in-water automatic spreading below the water surface even though the device 100 for in-water automatic spreading floats on the water surface, and a full effect of the medicament in the water body may be ensured by arranging the liquid outlet 192 on the shell of the device 100 for in-water automatic spreading below the water surface.

In some embodiments, the main water pump 180 may further provide a driving force for a movement of the device 100 for in-water automatic spreading. As illustrated in FIG. 3A and FIG. 3B, the rotation of the main water pump 180 may provide the suction to drive the liquid in the device 100 for in-water automatic spreading to flow along the preset direction, thereby driving the external liquid to flow into the device 100 for in-water automatic spreading through the first liquid inlet 191-1, the second liquid inlet 191-2, and the third liquid inlet 191-3. The liquid may be discharged from the liquid outlet 192. When the liquid outlet 192 discharges the liquid, a driving force opposite to a liquid discharge direction may be provided for the device 100 for in-water automatic spreading. For example, when the liquid outlet 192 is arranged below the shell of the device 100 for in-water automatic spreading and the main water pump 180 discharges the liquid from the liquid outlet 192, an upward driving force may be provided for the device 100 for in-water automatic spreading. When the driving force is greater than the gravity and another resistance of the device 100 for in-water automatic spreading, the device 100 for in-water automatic spreading may move upward.

In some embodiments of the present disclosure, the device 100 for in-water automatic spreading may perform a cleaning work and medicament spreading simultaneously by setting the cleaning module 170 and the main water pump 180, thereby reducing the maintenance cycle and cost of the water body.

In some embodiments, a driving mode of the driving module 120 may include a continuous driving mode and an intermittent driving mode.

When the driving module 120 is in the driving mode of the continuous driving mode, the driving module 120 may continuously drive the medicament to be spread to be separated from the storage module 110, and the corresponding first working parameter may include a separating speed of the medicament separated from the storage module 110. The device 100 for in-water automatic spreading may continuously spread the medicament.

When the driving module 120 is in the driving mode of the intermittent driving mode, the driving module 120 may intermittently drive the medicament to be spread to be separated from the storage module 110, and the corresponding first working parameter of the driving module 120 may include at least one of the separating speed, a driving intermittent time, a driving duration, or a spreading time range of the medicament separated from the storage module 110. The device 100 for in-water automatic spreading may intermittently spread the medicament.

The driving mode of the driving module 120 may be preset by the user or determined by the control module 150. More details about determining the driving mode of the driving module 120 by the control module 150 may be found elsewhere in the present disclosure, such as FIG. 5 and the related descriptions thereof.

In some embodiments, the device 100 for in-water automatic spreading may further include a working mode selection module (not shown in the figure). The working mode selection module may be configured to adjust the working mode of the device 100 for in-water automatic spreading. The working mode may include a spreading mode and a cleaning mode. The spreading mode refers to a mode of spreading the medicament to be spread from the device 100 for in-water automatic spreading into the water body. The cleaning mode refers to a mode of cleaning garbage or other impurities in the water body. When an operation of the device 100 for in-water automatic spreading, the device 100 for in-water automatic spreading may perform one working mode or may simultaneously perform two working modes.

In some embodiments, the mode selection module may include a spreading selection unit. The spreading selection unit may be configured to adjust the driving mode of the device 100 for in-water automatic spreading in the spreading mode. The driving mode of the device 100 for in-water automatic spreading in the spreading mode may include the continuous driving mode and the intermittent driving mode. More descriptions about the continuous driving mode and the intermittent driving mode may be found elsewhere in the present disclosure. The spreading selection unit may control the driving mode of the driving module 120 to perform a mode conversion between the continuous driving mode and the intermittent driving mode.

In some embodiments, the walking module 140 may further be configured to adjust an operation mode of the device 100 for in-water automatic spreading. The operation mode of the device 100 for in-water automatic spreading may include a water surface operation mode and an in-water operation mode. The water surface operation mode refers to an operation of the device 100 for in-water automatic spreading floating on the water surface. The in-water operation mode refers to an operation of the device 100 for in-water automatic spreading submerged in the water body. The walking module 140 may include a floating chamber and/or a propeller along a vertical direction. The floating chamber and/or the propeller along the vertical direction may provide a vertical force for the device 100 for in-water automatic spreading, so that the device 100 for in-water automatic spreading may perform a position conversion above and below the water surface.

In some embodiments of the present disclosure, the device 100 for in-water automatic spreading may implement a water spreading, an underwater spreading, a water cleaning, and an underwater cleaning, etc., by arranging different working modes and operation modes for the device 100 for in-water automatic spreading. Furthermore, the driving mode may be adjusted when the device 100 for in-water automatic spreading performs spreading. The user may select different modes according to requirements, thereby enhancing a selection diversity of the user, enriching the use of the device 100 for in-water automatic spreading, and a targeted spreading of medicament and/or water body cleaning may be performed through the device 100 for in-water automatic spreading, so as to improve a user experience.

It should be noted that the above descriptions of the device 100 for in-water automatic spreading and the modules of the device 100 for in-water automatic spreading are only for convenience of description, which do not limit the scope of the embodiments of the present disclosure. It should be understood that for those skilled in the art, after understanding the principle of the device, it is possible to combine various modules arbitrarily, or form subcomponents to connect with other modules without departing from the principle. In some embodiments, the storage module 110, the driving module 120, the walking module 140, and the control module 150 disclosed in FIG. 1 may be different modules in one device, or one module may implement functions of the above-mentioned two or more modules.

FIG. 5 is a schematic diagram illustrating a method for in-water automatic spreading according to some embodiments of the present disclosure. In some embodiments, a process 500 may be applied to the device 100 for in-water automatic spreading as described in the embodiments mentioned above, and the process 500 is executed by the control module 150. As illustrated in FIG. 5, the process 500 may include the following operations.

In 510, a target task for a target water body may be obtained.

The target water body may be a water body in which the target task that needs to be performed. For example, the target water body may be a swimming pool.

Figure 5:
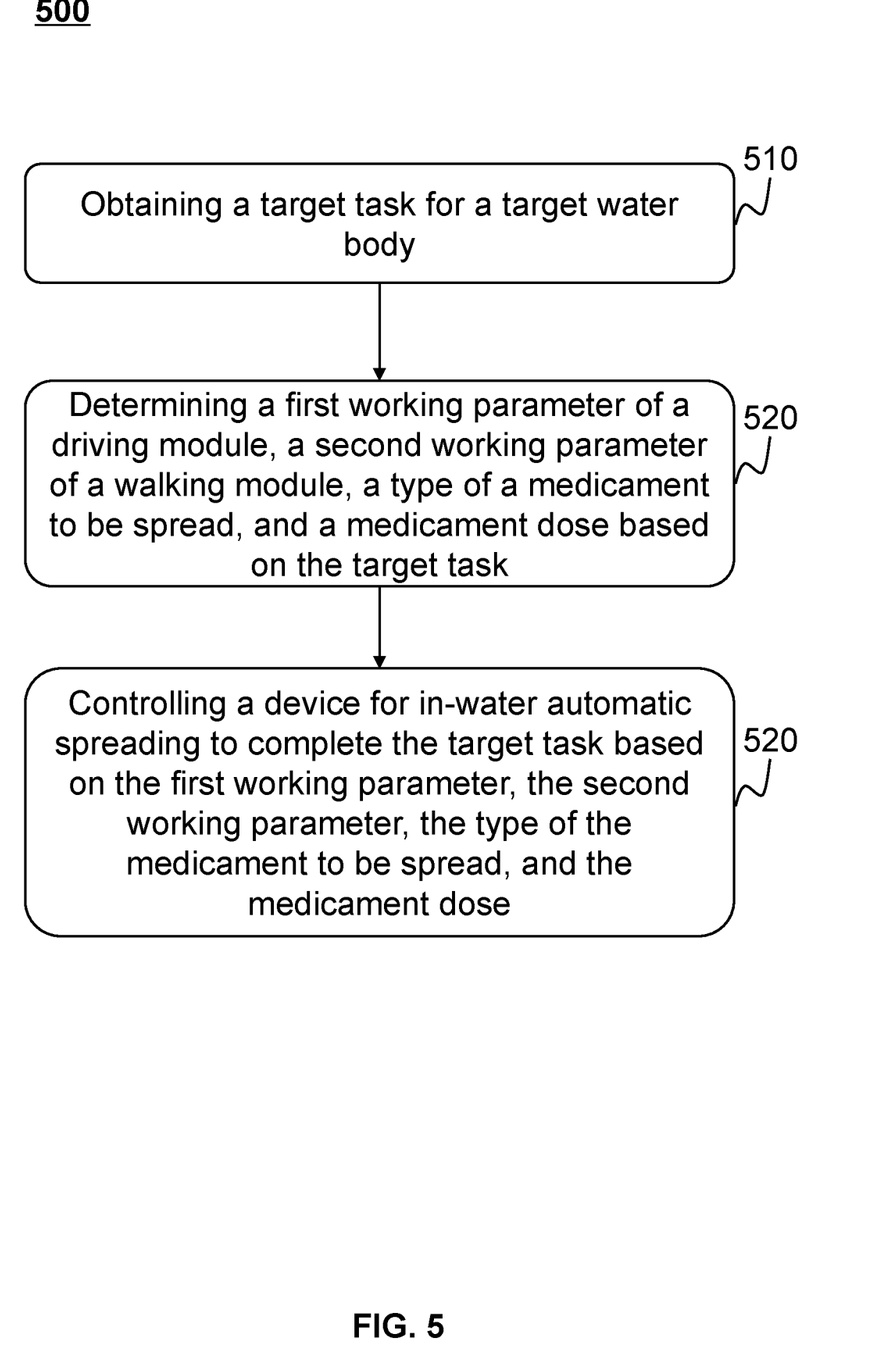
FIG. 5 is a schematic diagram illustrating a process for automatic spreading in water according to some embodiments of the present disclosure.

The target task may include performing a spreading task and/or a cleaning task to a target region in the target water body. The target region may be a specific position in the target water body where the target task needs to be performed. For example, the target region may include an entire swimming pool. For another example, the target region may further include a water surface of the swimming pool. For another example, the target region may further include various pool walls of the swimming pool. The spreading task may be a task of spreading the medicament to be spread in the target region. The cleaning task may be a task of cleaning garbage or other impurities in the target region.

The control module 150 may obtain the target task in various ways. For example, the control module 150 may obtain the target task input by the user. For another example, the control module 150 may be set to execute the target task periodically. For another example, the device 100 for in-water automatic spreading may further include a detection module, which may perform a water quality detection on each region of the target water body to obtain water quality data of the each region. The control module 150 may obtain the water quality data and determine the target task based on the water quality data. The water quality data may be data reflecting the water quality of each region of the target water body. The water quality data includes an image of each region of the target water body, a PH value, a total bacterial volume, a free residual chlorine, a urea, etc. In some embodiments, the control module 150 may input the water quality data into a task determination model, and an output of the task determination model may include a target task. The task determination model may analyze the water quality data of the target water body to determine a cleanliness (such as a clarity, an algae distribution, impurities, etc.) of each region (such as the water surface, the in-water region, each pool wall, etc.), thereby determine the corresponding target task. The task determination model may be a convolutional neural network model, a graph neural network model, or any other machine learning model that may realize the functions thereof. The task determination model may be trained and obtained based on a plurality sets of labeled training samples. The training samples may include sample water quality data of each region of a sample water body, and the label may include a sample tasks. The sample task may be obtained by manually labeling the sample water quality data. In some embodiments, the control module 150 may further determine whether the water quality data of each region of the target water body meets a preset condition to determine the target task. The preset condition may be a condition that the water quality data in each region of the target water body meets a requirement. For example, the preset condition may include that a PH value is within a range of 6.5 to 8.5. When the PH value in the water quality data of a certain region does not meet the preset condition, the corresponding target task may include performing a spreading task in the region, and the control module 150 may control the device 100 for in-water automatic spreading to spread a PH value regulator to adjust the PH value in the target water body.

In 520, a first working parameter of a driving module, a second working parameter of a walking module, a type of the medicament to be spread, and a medicament dose may be determined based on the target task.

The control module 150 may determine the first working parameter of the driving module 120, the second working parameter of the walking module 140, the type of the medicament to be spread, and the medicinal dose through various manners (e.g., a regression analysis method, a discriminant analysis, etc.).

In some embodiments, the control module 150 may determine the first working parameter, the second working parameter, the type of the medicament, and the medicament dose through the parameter determination module based on 3D data (three-dimensional data), the water quality data, and the target task of the target water body. The 3D data of the target water body may include a length, a width, a height of the target water body, a positional relationship between vertices of the target water body, or the like. It should be understood that, when the target task merely includes the cleaning task, the first working parameter and the medicament dose may be 0, and the type of the medicament may be omitted.

The parameter determination model may be one or more of a graph neural network model, a convolutional neural network model, a deep neural network model, or any other machine learning model that may implement the function mentioned above. The control module 150 may perform the training based on a plurality of sets of labeled training samples to obtain the parameter determination module. The training samples may include sample 3D data of a sample water body, sample water quality data, and a sample task, and the labels may include a sample first working parameter, a sample second working parameter, a sample type of medicament, and a sample medicament dose under a condition that the device 100 for in-water automatic spreading performs the sample task on the sample water body. The training samples and the labels may be obtained through manual labeling based on historical maintenance data of the sample water body. The control module 150 may input the training samples into a preliminary parameter determination model, construct a loss function based on an output and labels of the preliminary parameter determination model, iteratively update parameters of the preliminary parameter determination model based on the loss function until a preset condition is satisfied to terminate the training, and obtain a trained parameter determination model. The preset condition may include a convergence of the loss function, a training period reaching a threshold, etc.

In some embodiments of the present disclosure, various data and the target task of the target water body may be processed through a machine learning model, which may specifically determine the type of the medicament to be spread, the medicament dose required by the target water body for the target task, the first working parameter, and the second working parameter. Accordingly, the device 100 for in-water automatic spreading may perform the target task on the target water body in a more targeted manner, thereby avoiding manual calculation errors, shortening the maintenance period of the target water body, and reducing the maintenance cost of the target water body.

In some embodiments, the output of the parameter determination model may also include a third working parameter of the cleaning module 170. Correspondingly, when the parameter determination model is trained, the label may further include a sample third working parameter when the device 100 for in-water automatic spreading performs the sample task on the sample water body, so that the device 100 for in-water automatic spreading may be controlled more comprehensively, thereby shortening the maintenance period of the target water body and reducing the maintenance cost.

In 530, the driving module and the walking module may be controlled to complete the target task based on the first working parameter, the second working parameter, the type of the medicament, and the medicament dose, so that the device 100 for in-water automatic spreading may be controlled to complete the target task.

The control module 150 may determine the storage module 110 (e.g., a certain storage chamber storing a medicament corresponding to the type of the medicament) connected with the driving module 120 based on the type of the medicament, and further drive the medicament with the corresponding medicament dose to be separated from the storage module 110 based on the first working parameter. Simultaneously, the control module 150 may further control the movement of the walking module 140 based on the second working parameter to complete the target task.

In some embodiments, when the target task is the cleaning task, the control module 150 may further control the cleaning module 170 to complete the target task based on the third working parameter.

In some embodiments of the present disclosure, the device 100 for in-water automatic spreading may be able to automatically perform the cleaning task and/or the spreading task, thereby enriching a function of the device 100 for in-water automatic spreading, reducing a labor maintenance cost, and shortening a maintenance period of the target water body.

It should be noted that the description of the above-mentioned process 500 is only for examples and descriptions, but does not limit the scope of the application of the present disclosure. For those skilled in the art, various modifications and changes may be made to the process 500 under the guidance of the present disclosure. However, such modifications and changes are still within the scope of the present disclosure.

The basic concept has been described above, obviously, for those skilled in the art, the above detailed disclosure is only an example, and does not constitute a limitation to the present disclosure. Although not expressly stated here, those skilled in the art may make various modifications, improvements, and corrections to the present disclosure. Such modifications, improvements and corrections are suggested in the present disclosure, so such modifications, improvements and corrections still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure or characteristic related to at least one embodiment of the present disclosure. Therefore, it should be emphasized and noted that two or more references to "an embodiment" or "one embodiment" or "an alternative embodiment" in different places in the present disclosure do not necessarily refer to the same embodiment. In addition, certain features, structures, or characteristics in one or more embodiments of the present disclosure may be properly combined.

In addition, unless explicitly stated in the claims, the order of processing elements and sequences described in the present disclosure, the use of numbers and letters, or the use of other names are not used to limit the sequence of processes and methods in the present disclosure. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or a mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure method does not mean that the characteristics required by the object of the present disclosure are more than the characteristics mentioned in the claims. Rather, claimed subject matter may lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." Unless otherwise stated, the "about", "approximately" or "substantially" indicates that the stated figure allows for a variation of ±20%. Accordingly, in some embodiments, the numerical parameters set forth in the written description and attached claims are approximations that may vary depending upon the desired properties sought to be obtained by a particular embodiment. In some embodiments, numerical parameters should consider the specified significant digits and adopt the general digit reservation method. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications are also possible within the scope of the present disclosure. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A device for in-water automatic spreading configured to spread a medicament in a water body, comprising:
    a storage module configured to store a medicament to be spread;
    a driving module configured to separate the medicament from the storage module, the driving module being connected with the storage module;

a medicament outlet configured as an outlet for the medicament to be spread to enter a liquid after being separated from the storage module;
a walking module configured to drive the device for in-water automatic spreading to move in the water body according to a walking route; and
a control module configured to control the driving module and the walking module, the control module being connected with the driving module and the walking module, wherein the driving module comprises:
a driving pump configured to drive the medicament to be separated from the storage module, an end of the driving pump being connected with an outlet of the storage module, another end of the driving pump being connected to the medicament outlet, and the driving pump comprising:
a driving pump body configured to provide a driving force for separating the medicament from the storage module;
a first pipeline configured as a pipeline through which the medicament being separated from the storage module, an end of the first pipeline being connected with the outlet of the storage module, and another end of the first pipeline being connected with the driving pump body; and
a second pipeline configured to guide the medicament to the medicament outlet, an end of the second pipeline being connected to the driving pump body, and another end of the second pipeline being in communication with the medicament outlet.

2. The device of claim 1, wherein the storage module comprises:
one or more storage chambers configured to store the medicament to be spread, the one or more storage chambers including a flexible storage chamber or a rigid storage chamber.

3. The device of claim 2, wherein the flexible storage chamber includes a flexible storage bag, and the medicament to be spread is stored in the flexible storage bag.

4. The device of claim 2, wherein the flexible storage chamber is disposed in the rigid storage chamber.

5. The device of claim 1, wherein the storage module includes a rigid storage chamber configured to store the medicament, an outlet of the rigid storage chamber being connected with the end of the driving pump; and
the rigid storage chamber further includes:
a pressure regulating member configured to regulate a pressure in the rigid storage chamber.

6. The device of claim 1, wherein the storage module includes a rigid storage chamber configured to store the medicament, the rigid storage chamber further includes:
a pressure regulating member configured to regulate a pressure in the rigid storage chamber; and
the driving module includes:
a piston driving member configured to move in the rigid storage chamber to squeeze out the medicament in the rigid storage chamber.

7. The device of claim 6, wherein the rigid storage chamber includes at least one bending portion.

8. The device of claim 1, further comprising:
an agitating module configured to agitate the medicament separated from the storage module, the medicament being evenly mixed with another liquid in a space where the medicament is located.

9. The device of claim 8, wherein the agitating module includes an agitating member configured to agitate according to a preset motion track.

10. The device of claim 1, wherein a driving mode of the driving module includes a continuous driving mode and an intermittent driving mode, the continuous driving mode being configured to continuously drive the medicament to be separated from the storage module, the intermittent driving mode being configured to intermittently drive the medicament to be separated from the storage module.

11. The device of claim 1, further comprising:
a working mode selection module configured to adjust a working mode of the device for in-water automatic spreading, wherein
the working mode includes a spreading mode and a cleaning mode.

12. The device of claim 11, wherein the working mode selection module comprises:
a spreading selection unit configured to adjust a driving mode under the spreading mode, the driving mode under the spreading mode including a continuous driving mode and an intermittent driving mode.

13. The device of claim 1, wherein the walking module is further configured to adjust an operation mode of the device for in-water automatic spreading, the operation mode including a water surface operation mode and an in-water operation mode.

14. The device of claim 1, further comprising:
a liquid inlet for an external liquid to enter the device for in-water automatic spreading;
a liquid outlet for a liquid in the device for in-water automatic spreading to be separated from the device for in-water automatic spreading;
a main water pump configured to drive the external liquid to flow into a cleaning module of the device for in-water automatic spreading through the liquid inlet, and drive a cleaned liquid in the cleaning module into the water body through the liquid outlet; and
the cleaning module configured to clean the liquid or a walking region of the device for in-water automatic spreading.

15. The device of claim 14, wherein an end of the driving module is in communication with an outlet of the storage module, and another end of the driving module is in communication with the medicament outlet,
the main water pump is configured to drive the cleaned liquid to flow through the medicament outlet, mix the medicament flowing out of the medicament outlet with the cleaned liquid, and spread the medicament into the water body through the liquid outlet.

16. The device of claim 14, wherein the liquid outlet is disposed on at least one of a top portion, a bottom portion, and a side portion of a shell of the device for in-water automatic spreading.

17. The device of claim 14, wherein when the device for in-water automatic spreading floats on a water surface to spread the medicament, the device for in-water automatic spreading at least includes a liquid inlet disposed below the water surface and the liquid outlet.

18. A method for automatic spreading in water, when executed by a control module of a device for in-water automatic spreading, the method comprising:
obtaining a target task for a target water body, wherein the target task includes performing a spreading task or a cleaning task in a target region of the target water body;
determining, based on the target task, a first working parameter of a driving module of the device for in-water automatic spreading, a second working parameter of a walking module of the device for in-water automatic spreading, a type of medicament to be spread, and a medicament dose; and controlling, based on the first working parameter, the second working parameter, the type of medicament to be spread, and the medicament dose, the device for in-water automatic spreading to complete the target task, wherein the first working parameter at least includes a speed at which the medicament is separated from a storage module of the device for in-water automatic spreading, and the second working parameter includes a walking speed and a walking route of the walking module.

19. The method of claim 18, wherein the determining, based on the target task, a first working parameter of a driving module of the device for in-water automatic spreading, a second working parameter of a walking module of the device for in-water automatic spreading, a type of medicament to be spread, and a medicament dose comprises:

determining, by a parameter determining module of the device for in-water automatic spreading, the first working parameter, the second working parameter, the type of medicament to be spread, and the medicament dose based on three-dimensional (3D) data of the target water body, water quality data of the target water body, and the target task.

* * * * *